(12) United States Patent
Petty

(10) Patent No.: US 6,546,007 B1
(45) Date of Patent: Apr. 8, 2003

(54) TIME-SLOT INTERCHANGER THAT CONTROLS BOTH TIME-SLOT ACCESS AND SIGNAL-PROCESSING FEATURES

(75) Inventor: Norman W. Petty, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/283,347

(22) Filed: Mar. 31, 1999

(51) Int. Cl.[7] .............................................. H04L 12/50
(52) U.S. Cl. ...................... 370/376; 370/259; 370/260; 370/263; 370/266; 370/269; 370/270; 370/394
(58) Field of Search ................................ 370/263, 266, 370/269, 270, 259, 465, 376, 261, 262, 394, 260; 709/204; 379/202.01; 455/416, 414; 348/14.08, 14.09, 14.13

(56) References Cited

U.S. PATENT DOCUMENTS

| | | | |
|---|---|---|---|
| 4,112,258 A | | 9/1978 | Alles ........................... 370/378 |
| 4,424,418 A | | 1/1984 | Moore et al. .......... 379/204.01 |
| 4,485,469 A | | 11/1984 | Witmore ..................... 370/268 |
| 5,497,373 A | * | 3/1996 | Hulen et al. ................. 370/259 |
| 6,160,807 A | * | 12/2000 | Zdenek et al. .............. 370/376 |
| 6,178,184 B1 | * | 1/2001 | Petty ........................... 370/503 |
| 6,212,189 B1 | * | 4/2001 | Petty ...................... 370/395.61 |
| 6,226,288 B1 | * | 5/2001 | Allen .......................... 370/376 |

OTHER PUBLICATIONS

*Why ATM Makes Sense Here*, Computer Telephony, Apr. 1998, p. 74.

* cited by examiner

*Primary Examiner*—Wellington Chin
*Assistant Examiner*—Chuong Ho
(74) *Attorney, Agent, or Firm*—David Volejnicek

(57) ABSTRACT

A time-slot interchanger (TSI 100) is used to control both time-slot access and distribution of signals to physical or virtual signal-processing circuits (106–116). The TSI includes a control table (200) with an entry (202) for each time slot, that specifies the source (204, 205) and destination (230, 231) of signals received during the corresponding time-slot interval and the processing (208–228) of those signals. The TSI is coupled to the signal processing circuits, and sends the received signals to the signal processing circuits for processing along with control signals to effect the processing specified by the corresponding control-table entries. For conferencing, the TSI sends all signals for each conference in sequence to the conferencing circuit (108) before starting and sending any signals for any other conference, thereby allowing a single conference accumulator to support any number of conferences of any size.

15 Claims, 2 Drawing Sheets

| CONTROL TABLE 200 | | | | | | | |
|---|---|---|---|---|---|---|---|
| SOURCE | SOURCE ADDRESS | CONFERENCE NONE/START/CONTINUE/END | GAIN | ECHO NONE/CORRELATE/CANCEL | ECHO INSTANCE | COMPRESSION INSTANCE | DESTINATION | DESTINATION ADDRESS |
| 204 | 205 | 206 | 216 | 218 | 226 | 228 | 230 | 231 |
| ... | | | | | | | | |

*FIG. 2*

TIME-SLOT INTERCHANGER THAT CONTROLS BOTH TIME-SLOT ACCESS AND SIGNAL-PROCESSING FEATURES

TECHNICAL FIELD

This invention relates to a time-slot interchanger for a time-division multiplex switching system.

BACKGROUND OF THE INVENTION

Different information streams (e.g., individual voice or data communications) often require different signal processing. This is particularly true in business communications systems, which typically handle a variety of types of communications. Some information streams may require no signal processing at all, while others may require different combinations of conferencing, echo cancellation, compression, etc.

Voice-communications-oriented switching systems, such as private branch exchanges (PBXs), typically route and distribute (switch) information streams by using time-division-multiplex (TDM) switching fabrics (e.g., buses), and use time-slot interchangers (TSIs) to extract information streams for signal processing from the TDM switching fabrics and to insert processed information streams back into the TDM switching fabrics. Each signal-processing function typically has a corresponding TSI that delivers the appropriate information stream to and from that function.

A problem lies with information streams that require the use of a plurality of signal-processing functions (for example, conferencing plus echo cancellation). They also require either additional TDM fabric time-slots to distribute partially processed streams between the plurality of signal-processing functions, or require additional control for signal-processing circuits that perform multiple signal-processing functions to effect the proper combination of signal-processing functions.

SUMMARY OF THE INVENTION

This invention is directed to solving these and other problems and disadvantages of the prior art. Generally according to the invention, a TSI is used to control not only time-slot access but also distribution of signals to signal-processing entities.

According to the invention, the TSI is designed for coupling to a plurality of entities (e.g., hardware circuits, or software or firmware functions) each one of which performs a different signal-processing function on signals input thereto. The TSI includes an arrangement for determining first and second information that specifies processing for first signals and different processing for second signals, respectively. This arrangement is illustratively a memory that stores the first and second information, but it could also illustratively be a communications link via which the TSI receives the first and second information, or even a logic function that generates the first and second information on its own. The TSI further includes an arrangement that responds to the first information by receiving the first signals in first time slots (e.g., in time slots of frames of a time-division multiplex communications medium) and inputting them for processing to zero or more of the entities which correspond to (e.g., perform) the processing specified by the first information, and that responds to the second information by receiving the second signals in second time slots and inputting them for processing to zero or more of the entities which correspond to the processing specified by the second information. (The processing may include a transformation-less transfer, i.e., a no-op.) The first and the second information preferably includes control information for the entities, and the receiving and inputting arrangement conveys the control information included in the first information to ones of the entities, and conveys the control information included in the second information to others of the entities.

A single TSI configured according to the invention can serve a plurality of signal-processing functions, thus saving the expense of TSI replication. It can selectively configure the signal processing functions into various combinations and various sequences, so as to produce substantially any desired signal processing, and do so without needing a switching fabric to distribute partially-processed signals. The TSI is simple to implement: since it only extracts signals from time slots and enables appropriate signal-processing functions, it requires intelligent control only to set up the time slots and to enable the appropriate function controls. Illustratively, the TSI—as well as the signal-processing entities—may be implemented by a digital signal processor (DSP). The TSI also simplifies the design of some signal-processing entities. For example, in the case of the conferencing entity, the TSI sends all signals for each conference in sequence to the entity, before starting and sending any signals for any other conference, thereby allowing a single conference accumulator to support any number of conferences of any size. Moreover, the TSI control flexibility extends to multiple signal sources and destinations (e.g., signal-distribution media). For example, a TSI filling a T1 frame on a TDM bus may receive signals for 23B (traffic) channels from time slots of the TDM bus and may receive signals for the D (signaling) channel from a packet bus.

These and other features and advantages of the invention will become more evident from a description of an illustrative embodiment of the invention considered together with the drawing.

BRIEF DESCRIPTION OF THE DRAWING

FIG. 2 is a block diagram of a control table of the listen TSI function of the system of FIG. 1;

DETAILED DESCRIPTION

Figure 1:
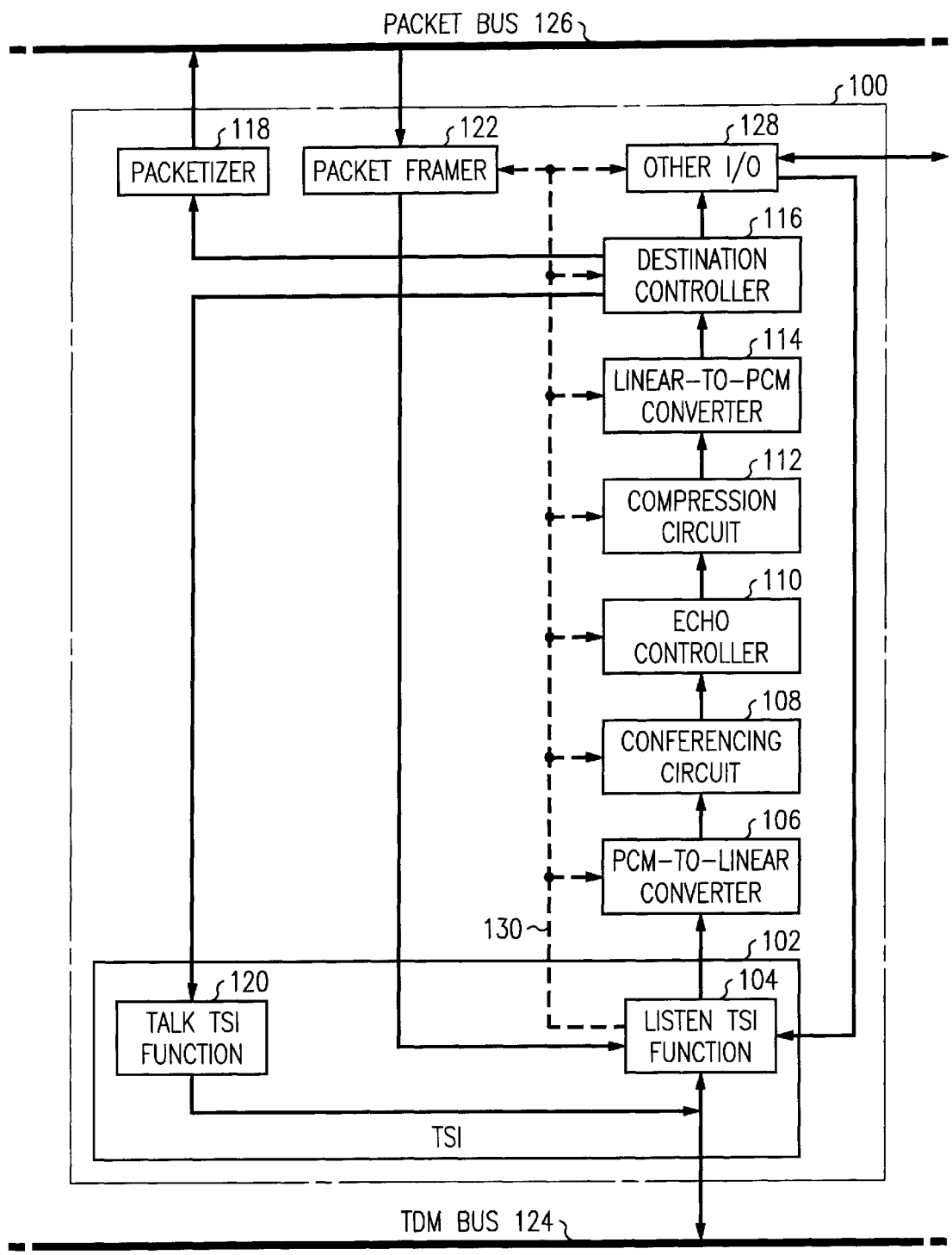
FIG. 1 is a block diagram of an illustrative voice-processing system that includes an illustrative embodiment of the invention.

FIG. 1 shows a voice-processing system comprising a voice-processing module 100 connected to a time-division multiplex (TDM) bus 124 and a packet bus 126. Module 100 provides various signal-processing functions for voice and other audio signals being transferred to/from TDM bus 124 to/from packet bus 126. Module 100 is illustratively included in an ATM port circuit of a Lucent Definity® PBX and buses 124 and 126 illustratively are the TDM and packet buses of the Definity PBX.

Module 100 includes a time-slot interchanger (TSI) 102 connected to TDM bus 124. A listen TSI function 104 of TSI 102 reads selected time slots of frames on TDM bus 124, while talk TSI function 120 writes selected time slots of frames on TDM bus 124. Listen TSI function 104 is also connected by a packet framer 122 to packet bus 126. Packet framer 122 reads selected packets (e.g., packets carrying control information or packetized voice traffic) from packet bus 126 and supplies their contents to listen TSI function 104. Listen TSI function 104 is optionally further connected to other signal inputs and outputs (I/O) 128. Listen TSI function 104 supplies signals read from TDM bus 124 or received from packet framer 122 or other I/O 128 to various ones of signal-processing circuits 106–116, which are entities that perform various signal-processing functions on those signals. TSI 102 is illustratively implemented in firmware on a digital signal processor having an interrupt for input and output time slots and direct memory access (DMA) into and out of its internal memory.

Circuits 106–116 illustratively include a pulse-code-modulation (PCM)-to-linear format converter 106, a conferencing circuit 108, an echo controller 110, a signal-compression circuit 112, a linear-to-PCM format converter 114, and a destination controller (e.g., a demultiplexer) 116. Circuits 106–116 may be implemented either as physical circuits via hardware or as logical circuits via programmed (firmware or software) functions of a digital signal processor (DSP). Destination controller 116 supplies the processed signals produced by circuits 106–114 selectively either to talk TSI function 120 for transmission on TDM bus 124, or to a packetizer 118 for encapsulation in packets and transmission on packet bus 126, or optionally to other I/O 128.

According to the invention, listen TSI function 104 supplies signals for processing to any and all circuits 106–114, as well as controls the operation of circuits 106–116. For this purpose, listen TSI function 104 includes a control table 200, which is shown in FIG. 2. Control table 200 has plurality of entries 202, one for each time slot—or, more precisely, time-slot interval—of a TDM bus 124 frame. Each entry 202 has a plurality of fields 204–230 that specify various control information. Source field 204 specifies whether or not listen TSI function 104 accepts input during the corresponding time-slot interval, and if so, whether the input is from TDM bus 124, packet framer 122, or other I/O 128. Source address field 205 is closely associated with source field 204 and specifies the address of a packet framer 122 queue or other I/O 128 source from which the input signals are to be retrieved. Conference field 206 specifies whether or not the signals accepted during the corresponding time-slot interval are to be conferenced with signals from other time-slot intervals, and if so, whether the corresponding time-slot interval is a conference start (first time slot to be conferenced), a conference continuation, or a conference end (last time slot to be conferenced). Gain field 216 specifies the amount of gain to be applied to this time slot's input signals by conferencing circuit 108. Echo field 218 specifies whether or not echo control is to be performed on the corresponding signals, and if so, whether the control is echo correlation or echo cancellation. Echo instance field 226 specifies the particular thread (e.g., channel), if any, of echo processing in echo controller 110 that is to be applied to the corresponding signals. Compression instance field 228 specifies the particular thread, if any, of compression processing in compression circuit 112 that is to be applied to the corresponding signals. Destination field 230 specifies whether the processed signals are to be sent to talk TSI function 120, to packetizer 118, or to other I/O 128. Destination address field 231 is closely associated with destination field 230 and specifies either the time slot of TDM bus 124 or the address of a packetizer 118 queue or other I/O 128 destination (e.g. an ATM virtual circuit) to which the processed signals are to be written.

Control table 200 is administered externally, e.g., by the switching processor of the Definity PBX. An entry 202 is administered at call setup when its corresponding time slot is allocated to a particular call, and it is populated with information for that particular call.

At the start of each TDM bus 124 time slot, listen TSI function 104 checks fields 204 and 205 of the time slot's corresponding entry 202 to determine if it is to receive input signals, and from what source. If the time-slot entry's source field 204 is null, function 104 accepts no input signals. If source field 204 indicates TDM bus 124 as a source, listen TSI function 104 sets itself up to receive signals from the corresponding TDM bus 124 time slot. If source field 204 indicates packet framer 122 or other I/O 128 as a source, function 104 requests the indicated source to forward signals from the address indicated by source address field 205. Upon receiving the input signals, listen TSI function 104 stores them in an internal TSI memory (e.g., sores them via DMA in the memory of the DSP which implements listen TSI function 104). Independently and simultaneously it retrieves stored input signals in any desired order (thereby effecting a TSI function) and sends them for processing to circuits 106–116. While listen TSI function 104 may cause input signals to be processed in the order in which they are received, in most cases—including in the case of signals that are being conferenced and signals that are being accumulated into composite ATM cells, frame-relay packets, or T1/E1 links—listen TSI function 104 must reorder the processing of input signals. For example, in the case of signals that are being conferenced together, listen TSI function 104 must send them to conferencing circuit 108 in sequence without intermediacy of any other input signals.

At the start of processing of a time slot of input signals, listen TSI function 104 distributes control information from the time slot's corresponding entry 202 to circuits 106–116 along with the input signals. If circuits 106–116 are hardware circuits, the distribution is done via a control link 130. If circuits 106–116 are implemented in firmware or software, the distribution is done via parameters of function calls made by listen TSI function 104 to invoke those circuits' functions.

If all fields 206–228 are null, a transformationless transfer through circuits 106–114—a no-op—is indicated and effected. If the time slot entry's conference field 206 indicates "none" and gain field 216 is null, function 104 either directs conferencing circuit 108 to pass signals through without processing or does not invoke the conferencing circuit 108 function. If conference field 206 indicates "conference-start", function 104 activates PCM-to-linear converter 106 and directs conferencing circuit 108 to perform a conference start, or invokes converter 106 function and invokes conferencing circuit 108 function with a "start" parameter. Conferencing circuit 108 responds by storing the input signals. If conference field 206 indicates "conference continue", function 104 activates converter 106 and directs circuit 108 to perform a conference continuation, or invokes converter 106 function and invokes conferencing circuit 108 function with a "continue" parameter. Conferencing circuit 108 responds by adding the input signals to the presently-stored signals or signals sum. If conference field 206 indicates "conference end", function 104 activates converter 106, directs circuit 108 to perform a conference end, and activates linear-to-PCM converter 114, or invokes converter 106 and 114 functions and invokes conferencing circuit 108 function with an "end" parameter. Conferencing circuit 108 responds by adding the input signals to the presently stored signals or signals sum and outputs the resulting signals sum. The conferencing circuit 108 receives all conference signals for a conference in sequence, without intermediacy of any other signals. A single conference accumulator is therefore able to support any number of conferences of any size.

If gain field 216 indicates a non-zero gain, function 104 directs circuit 108 to multiply the input signals by the specified gain value prior to combining them with the other conference input signals, or invokes circuit 108 function with the gain value as a parameter. If field 216 is non-zero and field 206 is null, a simple gain operation is indicated, which is effected as a combined conference-start and conference-end operation.

If echo field 218 indicates "none", function 104 either directs hardware echo controller 110 to pass the input signals through without processing or does not invoke the echo controller 110 function. If echo field 218 indicates correlation, function 104 directs the output of conferencing circuit 108 to echo controller 110 to perform an echo correlation function on the input signals by using the one of its internal processing threads identified by echo instance field 226, or invokes converter 106 and 114 functions and invokes echo controller 110 function with a correlation and the processing-thread identifier from echo instance field 226 as parameters. If echo field 218 indicates cancellation, function 104 activates converters 106 and 114 and directs echo controller 110 to perform an echo cancellation function on the input signals by using one of its internal processing threads identified by echo instance field 226, or invokes converter 106 and 114 functions and invokes echo controller 110 function with cancellation and the processing-thread identifier from echo instance field 226 as parameters.

If compression instance field 228 is null, function 104 either directs hardware compression circuit 112 to pass signals through without processing or does not invoke the compression circuit 112 function. If compression instance field 228 is not null, function 104 activates converters 106 and 114 and directs compression circuit 112 to perform signal compression on the input signals by using the one of its internal processing threads identified by compression instance field 228, or invokes converter 106 and 114 functions and invokes compression circuit 112 function with the processing-thread identifier from compression instance field 228 as a parameter.

Finally, if destination field 230 is not null, function 104 directs destination controller 116 to send signals to the destination—talk TSI function 120, packetizer 118, or other I/O 128—specified by destination field 230 along with the time-slot identifier or address specified by destination address field 231.

In each case discussed above, multiple simultaneous activations/invocations of converter 106 or 114 act as a single activation/invocation.

Of course, various changes and modifications of the illustrative embodiment described above may be envisioned by those skilled in the art. For example, the talk TSI may also, or instead, have like capabilities and associated circuits as the listen TSI, especially for decompression and selective routing functions. Such changes and modifications can be made without departing from the scope and the spirit of the invention and without diminishing its attendant advantages. It is therefore intended that such changes and modifications be covered by the following claims except insofar as limited by the prior art.

What is claimed is:

1. A processing system comprising:
   a plurality of entities each one of which performs a different signal-processing function on signals input thereto, including a format converter, a conferencer having a single accumulator for use by all conferences being effected by and all signals conferenced by the processing system, an echo canceler, and a signal compressor;
   means for determining first and second information that specifies processing for first signals and different processing for second signals, respectively; and
   a time slot interchanger (TSI) for connecting to a plurality of external communications links, responsive to the first information for receiving the first signals in first time slots from any one of the plurality of communications links that is specified by the first information, inputting a sequence of the first signals for processing to a first serial sequence of a plurality of the entities, which first sequence corresponds to the processing specified by the first information wherein the first signals are processed by all of the entities of the first serial sequence, without passing meanwhile through the TSI, and outputting the processed first signals to any one of the plurality of communications links that is specified by the first information, and responsive to the second information for receiving the second signals in second time slots from any one of the plurality of communications links that is specified by the second information, inputting a sequence of the second signals for processing to a second serial sequence, different from the first serial sequence, of a plurality of the entities, which second sequence corresponds to the processing specified by the second information wherein the second signals are processed by all of the entities of the second serial sequence without passing meanwhile through the TSI, and outputting the processed second signals to any one of the plurality of communications links that is specified by the second information.

2. The system of claim 1 wherein:
the first and the second information includes control information for ones of the entities; and
the TSI is further responsive to the first information by conveying the control information that is included in the first information to the first sequence of the entities, and is further responsive to the second information by conveying the control information that is included in the second information to the second sequence of the entities.

3. The system of claim 1 wherein:
the determining means comprise
memory for storing the first and the second information.

4. The system of claim 3 wherein:
the memory stores a plurality of entries each corresponding to a different one of a plurality of time slots of a time-division frame.

5. The system of claim 4 wherein:
each entry includes information specifying processing for signals corresponding to the entry's time slot.

6. The system of claim 5 wherein:
each entry includes information selectively identifying a source and a destination of signals corresponding to the entry's time slot.

7. The system of claim 4 wherein:
a first entry specifies a conference start to cause the conferencer to store signals corresponding to the entry's time slot in the accumulator; and
a sequential second entry specifies a conference end to cause the conferencer to add signals corresponding to the entry's time slot to signals stored by the accumulator to produce sum signals and to output the sum signals.

8. The system of claim 7 wherein:
the first and second entries correspond to respectively non-sequential time slots; and
the TSI inputs the signals corresponding respectively to the time slots that correspond to the first and second entries sequentially to the conferencer.

9. The system of claim 4 wherein:

a first entry specifies a conference start to cause the conferencer to store signals corresponding to the entry's time slot in the accumulator;

at least one second entry sequential with the first entry specifies a conference continue to cause the conferencer to add signals corresponding to the entry's time slot to signals stored by the accumulator to produce new stored signals; and a third entry sequential with the at least one second entry specifies a conference end to cause the conferencer to add signals corresponding to the entry's time slot to signals stored by the accumulator to produce sum signals and to output the sum signals.

10. The system of claim 9 wherein:

the first and second entries correspond to respectively non-sequential time slots; and the TSI inputs the signals corresponding respectively to the time slots that correspond to the first and second entries sequentially to the conferencer.

11. The system of claim 1 wherein:

the TSI comprises a digital signal processor (DSP).

12. The system of claim 11 wherein:

the plurality of entities comprise a plurality of functions performed by the DSP.

13. The system of claim 12 wherein:

the determining means are included in the DSP.

14. The system of claim 1 in combination with:

a TDM medium connected to the TSI and defining the time slots.

15. The combination of claim 14 wherein:

the TSI comprises means for transmitting the processed first signals in first time slots defined by the TDM medium and transmitting the processed second signals in second time slots defined by the TDM medium.

* * * * *